INVENTOR.
ARIEL R. DAVIS
ATTORNEY

INVENTOR.
ARIEL R. DAVIS
BY
George C. Power
ATTORNEY

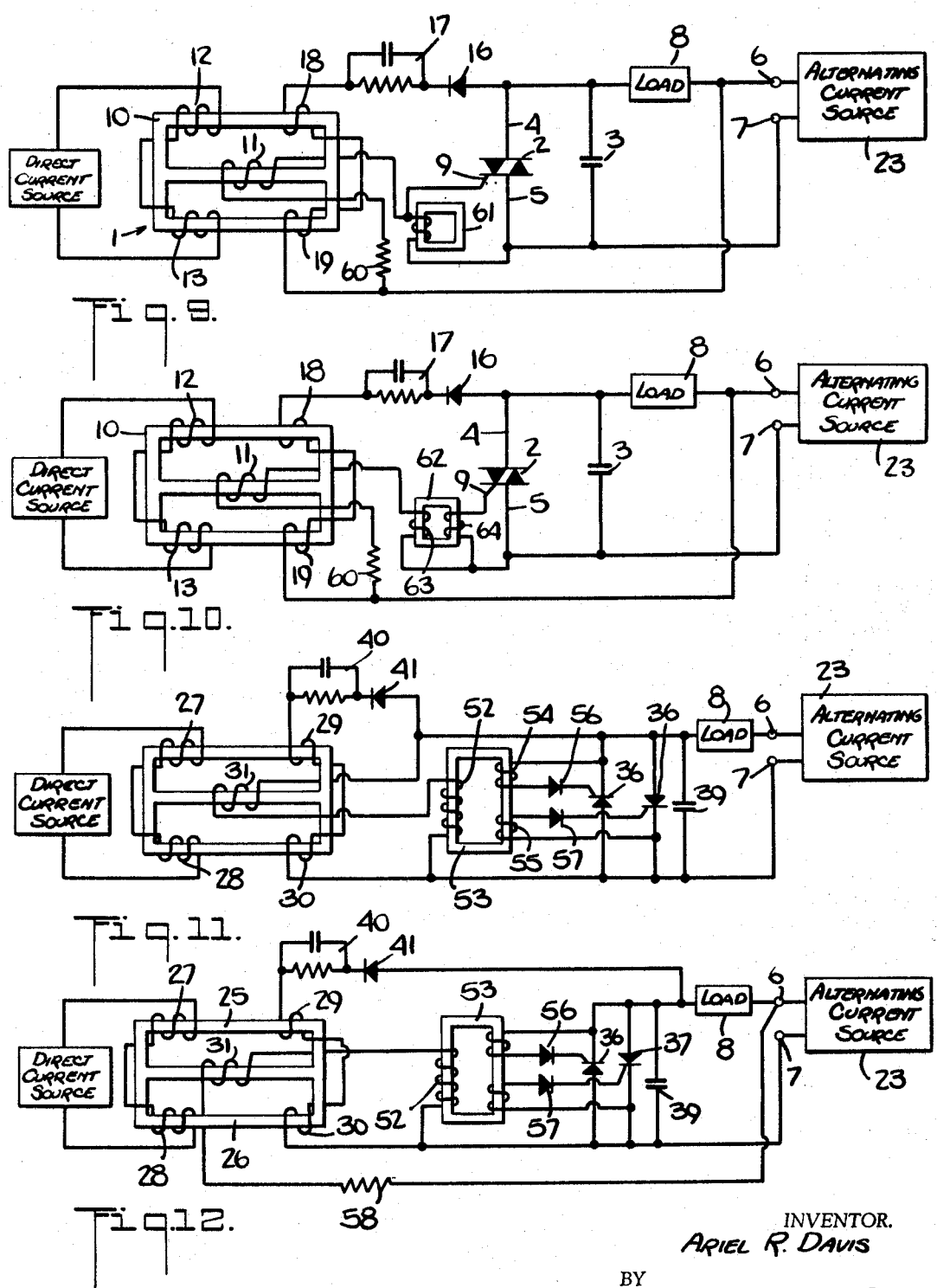

INVENTOR.
ARIEL R. DAVIS
BY
George C. Power
ATTORNEY

United States Patent Office 3,388,294
Patented June 11, 1968

3,388,294
SATURABLE REACTOR DIMMER
Ariel R. Davis, 3476 Fleetwood Drive,
Salt Lake City, Utah 84109
Continuation-in-part of application Ser. No. 467,977,
June 29, 1965. This application Sept. 21, 1965, Ser.
No. 488,842
17 Claims. (Cl. 315—194)

ABSTRACT OF THE DISCLOSURE

A phase control circuit utilizing a saturable reactor for varying the time of application of firing signals to controlled solid state devices to control the amount of load current passed. The circuits include negative feedback circuits for load current correction and self regulation and saturating transformers for narrowing and sharpening the rise time of the firing signal.

Related application

This is a continuation-in-part of my application Ser. No. 467,977 filed June 29, 1965 and entitled "Saturable Reactor Triac Dimmer," now abandoned.

Background of the invention

This invention relates to phase control of the firing of solid state controlled devices by saturable reactors, and is directed particularly to the control of load current supplied to an incandescent load for varying the illumination from blackout to full brilliance.

The control of load current supplied to incandescent lamps has been accomplished by many different types of electrical devices. In recent years solid state controlled devices, such as silicon controlled rectifiers, have been used to control large amounts of load current. Two of the advantages of such devices are the small size for the amount of current passed and the low cost of the devices. These advantages have been offset by large and complicated circuits for controlling the solid state controlled devices. The ultimate size and cost of the complete unit is substantially the same as that of prior units.

Simplification of the firing circuits has been attempted and partly attained, but the units are still large and costly. This is particularly true if proper variations of the load current is to be attained for securing a desired varying in illumination of an incandescent lamp load.

An object of the invention is to provide a solid state controlled device firing circuit that has a minimum number of components and produces the desired variation in load current.

Another object of the invention is to provide a firing circuit for varying the phase of the control signal applied to a solid state controlled device that electrically isolates the solid state controlled device from other control circuits and solid state controlled devices to permit multiple control without cross interference.

Other objects and advantages will be apparent from the following description taken in connection with the drawings.

Brief description of the drawings

FIG. 9 is a modification of the embodiment shown in FIG. 8 with a single winding saturating transformer to limit the width of the firing pulse;

FIG. 10 is another modification of the embodiment shown in FIG. 8 with a double winding saturating transformer to limit the width of the firing pulse;

FIG. 11 illustrates a self-clipping saturable reactor and saturating transformer firing circuit with a feedback circuit;

FIG. 12 illustrates the circuit similar to FIG. 11 except to providing a sustained pulse;

Detailed description

Figures 1, 2, 3, 4:
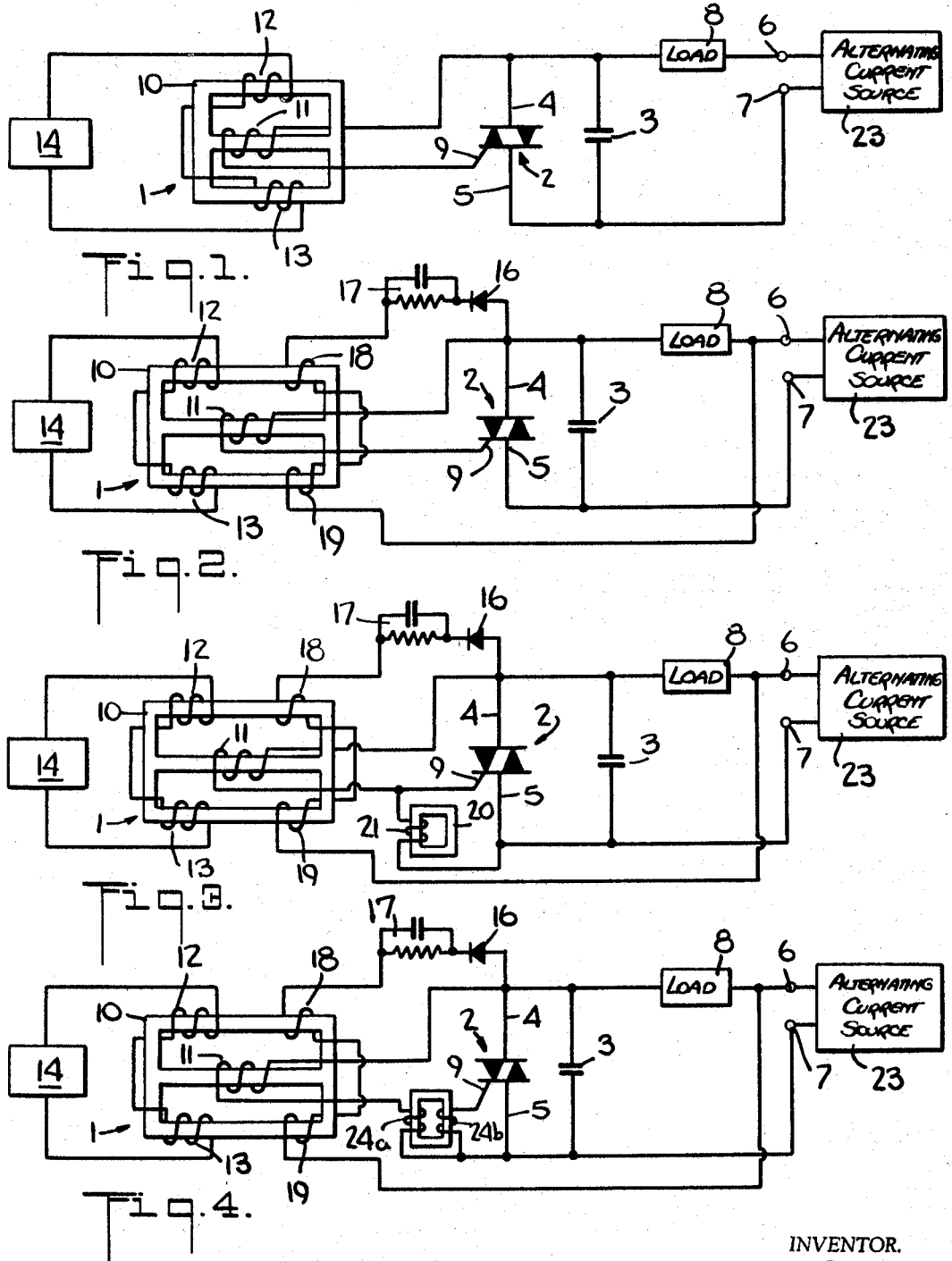
FIG. 1 illustrates a saturable reactor firing circuit for controlling a triac.
FIG. 2 is a modification of the firing circuit of FIG. 1 with a feedback circuit.
FIG. 3 illustrates a saturable reactor firing circuit with a feedback circuit and a single winding pulse transformer for controlling the current through a triac.
FIG. 4 illustrates a saturable reactor firing circuit with a double winding pulse transformer and a feedback circuit for controlling the current through a triac.

The dimming circuit essentially consists of three components comprising a saturable reactor 1, a three-electrode solid state device 2 and a capacitor 3. The three-electrode solid state device is a triode A.C. semiconductor switch generally known as a triac. The triac can conduct current in both directions in response to a positive or negative signal. The triac has two load current carrying terminals 4 and 5 connected to the alternating input power terminals 6 and 7 through the lamp load 8. An alternating current source 23 is connected across the terminals 6 and 7. The triac passes current in either direction, so that a full wave alternating current passes through the lamps 8. The gate electrode 9 is connected to the saturable reactor 1. The saturable reactor has a three-legged iron core 10, a main winding 11 wound around the center leg and two saturating control windings 12 and 13 wound around the outside legs of the core. The windings 12 and 13 have an equal number of turns. The main winding is connected to the gate electrode and to the load carrying terminal 4 of the triac for connecting the main coil to receive alternating current.

The control windings 12 and 13 are connected in series to a control unit 14. The control unit 14 provides a D.C. signal which is varied by the adjustment of a potentiometer on a control panel. The control windings 12 and 13 are wound so as to provide flux in the same direction in the outside legs. This varies the flux density in the core and the point of saturation in relation to the alternating current passing through the main winding 11. When saturation occurs, either a positive or negative signal is applied across the gate electrode 9 and the terminal electrode 4 to fire the triac. Since the control windings are connected in a series bucking relation and have an equal number of turns, any induced alternating voltages are cancelled. The direct current signal applied by the control unit 14 saturates the outside magnetic path and causes the entire core to saturate. This reduces the impedance of the winding 11 with the resultant application of a firing pulse to the triac. On conduction of the triac in either direction the current of the main winding 11 is cut off so that the circuit is self-clipping.

A control is provided nearly over the entire zero to 180° span of each half wave. Thus a full variation from dimout to full brilliance can be produced in the incandescent lamp load.

The capacitor 3 suppresses transient signals which may prematurely fire the triac. These transients may be caused by the firing of other triacs in the dimming system or by outside line disturbances.

The saturable reactor also functions as an isolating component to isolate the control signal from the power line. As a result, the dimming system is quite suitable and capable of functioning with other dimming units.

The reactor is approximately 1.3 cubic inches, and has dimensions of 1.375", 1.5" and .625". The capacitor is approixmately .75" in length and .375" in diameter, and the triac is approximately .75" high and .5" in diameter. The components are small enough to be used in a small aluminum cup having a diameter of approximately two inches and a height of approximately two and one-half inches. The cup protects the parts and also functions as a heat sink. The triac is mounted on the cup or housing in a heat transferring relation. A small loading reactor can be connected in series to eliminate radio frequency interference and to protect the solid state device from surge currents. These reactors may be located in any convenient place in the power lines.

The embodiment illustrated in FIG. 2 is identical to the embodiment in FIG. 1 except that a feedback circuit has been provided. This circuit comprises a rectifier 16 and parallel resistor capacitor network 17 and windings 18 and 19 on the outer legs of the reactor. These elements are connected in series across the load 8. The windings 18 and 19 are wound in opposition to the control windings 12 and 13 and provide a negative feedback for self-regulation of the circuit and to modify the illumination curve for an incandescent lamp load depending on the amount of feedback current. The feedback windings 18 and 19 are wound next to the iron core and the control windings 12 and 13 are wound outside the feedback windings. The fluxes of the feedback windings are thus in closer magnetic coupling with the core than the fluxes of the control windings to provide effective opposition to the stronger fluxes of the control windings. The feedback current flows in an opposite direction to the control current to produce an opposing flux. If the feedback windings provide a flux in a positive direction, the reactor turns on faster. The rectifier 16 may be of the half wave type, as illustrated, or of the full wave type for slightly better operation.

The embodiment illustrated in FIG. 3 is identical to the embodiment of FIG. 2 except that a saturating transformer 20 having a single winding 21 is connected between the gate electrode 9 and the main electrode 5. The saturating transformer 20 narrows the width of the firing pulse. In the embodiment of FIG. 4 a saturating transformer 24 with two windings 24a and 24b is illustrated to sharpen the firing pulse. Both of these circuits have a self-clipping action which is enhanced by saturating the transformer.

Figure 5:
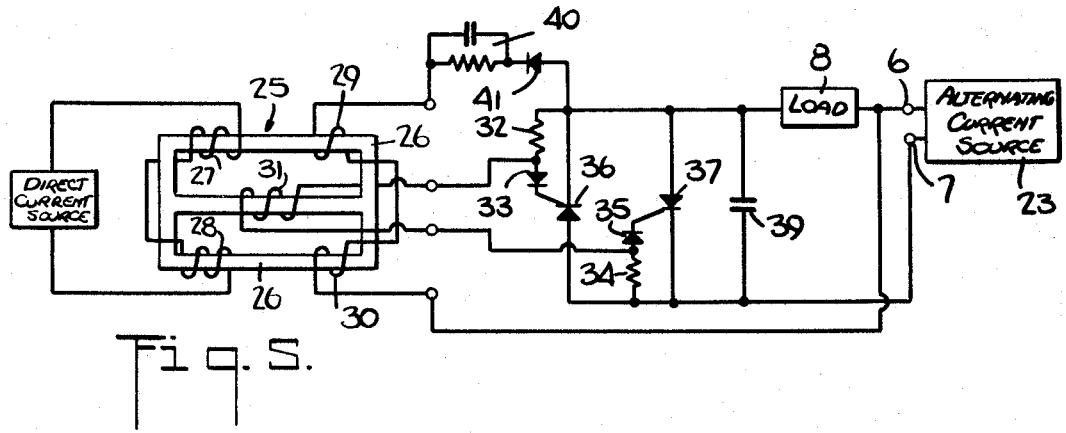
FIG. 5 illustrates a saturable reactor firing circuit with a feedback circuit for controlling the current through silicon controlled rectifiers.

In the embodiment of FIG. 5 silicon controlled rectifiers are connected in back-to-back relation in series with the load 8 across the terminals 6 and 7. Alternating current power is supplied by the source 23. The saturable reactor 25 has a three-legged core 26 with the control windings 27 and 28 wound on the outer legs with the feedback windings 29 and 30. The windings 27 and 28 are connected to a direct current source for controlling the point of saturation of the core. On the center leg is a gate winding 31. The gate winding is connected between the resistor 32 and rectifier 33 and the resistor 34 and rectifier 35 to provide an alternating current to the gate winding 31 corresponding to the alternating current applied across the silicon controlled rectifiers 36 and 37. The gate winding 31 is connected to the rectifiers 36 and 37 through the diodes 33 and 35 which limit the flow of current in one direction to prevent overheating of the gates of the silicon controlled rectifiers. The saturation of the core 25 by the winding 31 is controlled by the current in the windings 27 and 28. When saturation is reached, an inrush of current occurs which produces a pulse that is applied to the silicon controlled rectifiers through the diodes 33 and 35. With the gate winding directly connected to the alternating current source of a self-clipping action occurs when the rectifiers 36 or 37 conduct. The feedback windings 29 and 30 and the parallel resistor capacitor network 40 and rectifier 41 connected in series across the load provide a negative feedback for load current correction and self-regulation. The capacitor 39 functions in a similar manner to the capacitor 3. The resistors 32 and 34 provide for a very smooth illumination curve when the load is an incandescent lamp and permit the lamp to be dimmed to blackout. The diodes 33 and 35 protect the silicon controlled rectifiers against reverse current which reduces the heating of the junction. The resistors 32 and 34 permit the reversal of current through the gate winding 31 to reset the core on each cycle. The direct connection of the gate winding to the silicon controlled rectifiers maintains the gate current until the silicon controlled rectifier conducts. This maintains the signal on the SCR until it fires.

Figure 6:
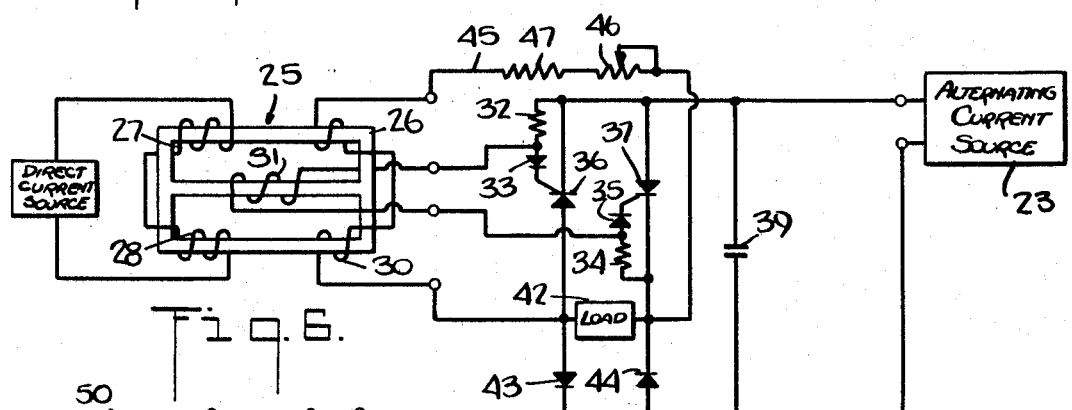
FIG. 6 illustrates a modification of the embodiment of FIG. 5 with a direct current output.

In the embodiment of FIG. 6 a modification of the embodiment of FIG. 5 is shown for the connection of a direct current load 42 between the silicon controlled rectifiers 36 and 37. Diodes 43 and 44 are connected in series with the rectifiers 36 and 37 to form a bridge circuit with one diagonal connected across the alternating current source 23. With the diodes and the rectifiers connected in a back-to-back relation a direct current is passed through the load 42. The feedback circuit 45 comprising the windings 29 and 30 and the adjustable resistor 46 and fixed resistor 47 connected in series is connected across the direct current diagonal of the bridge circuit. This embodiment may be used where direct current is to be supplied for battery charging, control of a direct current motor or the like.

Figure 7:
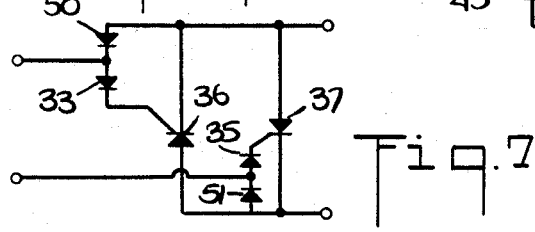
FIG. 7 is a fragmentary circuit illustrating a modification of the circuits shown in FIGS. 5 and 6.

In FIG. 7 a modification of the connection between the gate and main electrode of a silicon controlled rectifier is illustrated in which diodes 50 and 51 replace the resistors 32 and 34. The advantage of the resistor form is that in connection of an incandescent lamp load the lights may be reduced to blackout.

Figure 8:
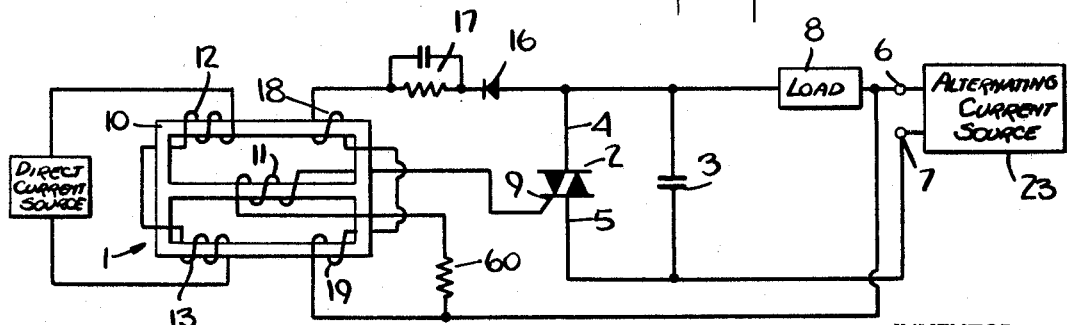
FIG. 8 illustrates a saturable reactor firing circuit providing a sustained firing pulse for controlling the current through a triac.

In the embodiment shown in FIG. 8 the circuitry is similar to that of the embodiment of FIG. 2 except that the gate winding 11 is connected in series with the resistor 60 between the gate electrode 9 and the alternating current source. This provides a sustained pulse for firing the triac 2.

In FIGS. 9 and 10 modifications of the embodiments of FIG. 8 are illustrated. In FIG. 9 a single winding saturating transformer 61 is connected across the gate electrode and the main electrode of the triac to increase the rise time of the firing pulse. In FIG. 10 a double winding transformer 62 is provided with the primary winding 63 connected in series with the gate winding 31 and a secondary winding 64 connected to the gate electrode and the main electrode.

In FIGS. 11 and 12 two embodiments are illustrated in which the firing circuit comprises a saturable reactor and a triple winding saturating transformer. The saturable reactor (FIG. 11) is the same as in the embodiments of FIGS. 5 and 6 and has a gate winding 31, control windings 27 and 28 connected to a direct current source, and feedback windings 29 and 30. The gate winding 31 is connected in series with the primary winding 52 of the saturating transformer 53 across the alternating source 23. Secondary windings 54 and 55 are connected to the silicon controlled rectifiers 36 and 37 through the diodes 56 and 57. The diodes 56 and 57 function in the usual manner to permit only positive pulses to be applied to a respective silicon controlled rectifier. The feedback circuit is similar to the feedback circuit of FIG. 5 with the resistor capacitor network 40 and rectifier 41 connected in a similar manner to the feedback circuit of FIG. 5. With the gate winding 31 and primary winding 52 connected across the silicon controlled recitfiers, a self-clipping action occurs and with the saturating transformer a very sharp pulse is formed having a fast rise time. This reduces the amount of energy injected into the silicon controlled rectifier so that it runs cooler. However, if the self-clipping action is not desired and a sustained firing pulse is more appropriate in the case of a high inductive load, then the gate winding 31 (FIG. 12) is connected to the alternating current source 23 through the resistor 58 and the line 59.

Figure 13:
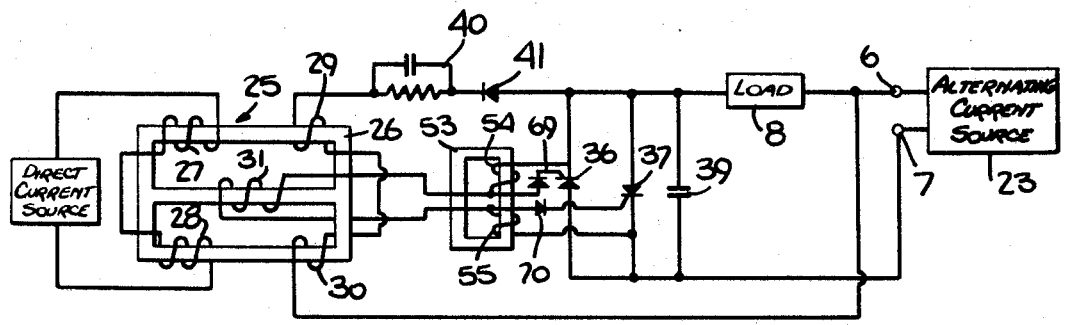
FIG. 13 illustrates a saturable reactor and a double winding saturating transformer firing circuit.

FIG. 13 illustrates a self-clipping embodiment similar to the embodiment of FIG. 11. The gate winding 31 is connected directly to the firing pulse windings 54 and 55 of the saturating transformer 53.

Figure 14:
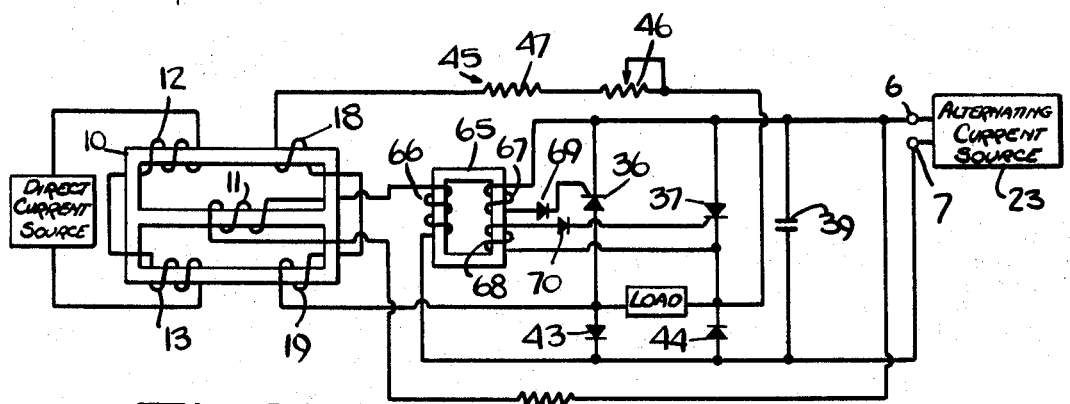
FIG. 14 illustrates a saturable reactor and saturating transformer firing circuit providing a sustained pulse for controlling silicon controlled rectifiers having a direct current output.
Figure 15:
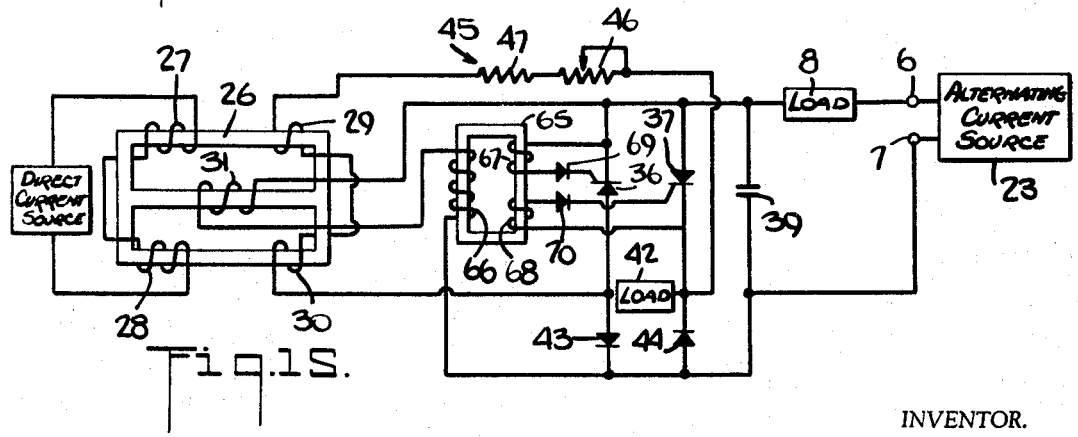
FIG. 15 illustrates a saturable reactor and saturating transformer firing circuit providing a clipped pulse for controlling silicon controlled rectifiers having a direct current output.

In FIGS. 14 and 15 embodiments are illustrated similar to the embodiment of FIG. 6 for producing a direct current output, except that in these embodiments triple winding saturating transformers 65 are provided, primary windings 66 are connected in series with the gate windings 31 and the secondary windings 67 and 68 connected to the rectifiers 36 and 37 through diodes 69 and 70 for producing sharp rising firing pulses. In the embodiment of FIG. 14 the gate winding 11 is connected through the resistor 71 to the alternating current source 23 to produce a sustained signal. In the embodiment of FIG. 15 the gate winding 31 is connected across the silicon controlled rectifiers through the primary windings 66 of the saturating transformer 65 to produce a self-clipping action.

Figure 16:
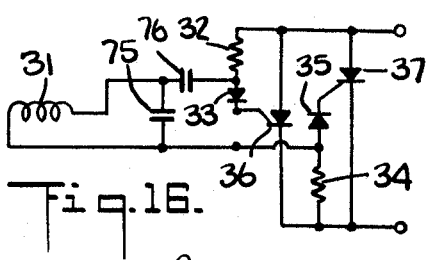
FIG. 16 is a fragmentary circuit illustrating a modification of FIG. 5.

FIG. 16 illustrates a modification of the circuit shown in FIG. 5 in which a very small capacitor 75 is connected in parallel with the gate winding 31 and a capacitor 76 connected in series with the gate winding 31. The parallel capacitor 75 is connected at a point between the gate winding 31 and the capacitor 76. These capacitors increase the range of operation of the saturable reactor 25 by functioning with the inductance of the gate winding 31 to produce a resonant effect. The parallel capacitor 76 produces a resonant action at the low levels of direct current saturation to greatly decrease the current passing through the gate winding 31. The series capacitor 76 produces a series resonance at high saturation values of the reactor 25 to substantially increase the current through the gate winding 31. The later capacitor is preferred. Excellent operation can be attained without the parallel capacitor 75. Thus for the control current supply a greater range of operation is created. The other embodiments may be similarly modified for greater range of operation.

The invention is set forth in the appended claims.

I claim:

1. Apparatus for controlling the illumination of incandescent lamps supplied with load current from an alternating current source comprising a triac having two load current carrying terminals for connection to an alternating current source through an incandescent lamp load and a gate electrode for initiating the passage of load current through the triac over each half cycle, a saturable reactor having a core of the three-legged type with series connected control windings wound on the outer legs to produce a flux additive in the outside legs and a main winding wound on the center leg and connected to one of said terminals and said gate electrode to be solely in series with said terminal and said electrode for passing alternating current increasing substantially on saturation of the core, and control means connected to said control windings for adjusting the flux density and the time of saturation of the core in relation to each half cycle for varying the level of illumination of the lamps in response to the change in said control means.

2. Apparatus for controlling the illumination of incandescent lamps supplied with load current from an alternating current source comprising a triac having two main terminals and a gate electrode, a saturable core reactor having a core of the three-legged type with control windings on the outer legs producing flux additive in the outside legs and a main winding on the center leg connected across the triac to be solely in series with said terminal and said electrode for passing alternating current through said main winding from an alternating current source and increasing substantially on saturation of the core, and control means connected to said control windings for adjusting the flux density and the time of saturation in relation to each half cycle of the current supplied by an alternating current source.

3. Apparatus for controlling the illumination of incandescent lamps as set forth in claim 1 wherein a capacitor is connected across the terminals to reduce transient interference.

4. Apparatus for controlling the illumination of incandescent lamps as set forth in claim 1 wherein said saturable reactor has feedback windings on the outer legs of said core and a feedback circuit is provided connecting said windings across the incandescent lamps to modify the variation in illumination thereof.

5. Apparatus for controlling the illumination of incandescent lamps as set forth in claim 1 wherein a saturating transformer is connected between said gate electrode and one of said load current carrying terminals to narrow the width of the firing pulse.

6. Apparatus for controlling the illumination of incandescent lamps as set forth in claim 5 wherein said saturating transformer has a primary winding connected in series with said main winding across said triac and a secondary winding connected between said gate electrode and one of said terminals.

7. Apparatus for controlling the illumination of incandescent lamps as set forth in claim 1 wherein said main winding is connected between said gate electrode and the opposite side of the load from one of said terminals of said triac to provide a sustained firing pulse.

8. Apparatus for controlling the illumination of incandescent lamps as set forth in claim 7 wherein a saturating transformer is connected between said gate electrode and the other of said terminals to increase the rise time of the firing pulse.

9. Apparatus for controlling the illumination of incandescent lamps as set forth in claim 8 wherein said saturating transformer has a primary winding connected in series with said main winding and the other of said terminals and a secondary winding connected between said gate electrode and the other of said terminals.

10. Apparatus for controlling the illumination of incandescent lamps supplied with load current from an alternating current source comprising an output, two silicon controlled rectifiers having main terminals connected in back-to-back relation across said output and gate electrodes for initiating passage of load current through a respective rectifier, a saturable reactor having a core of the three-legged type with series connected control windings wound on the outer legs to produce a flux additive in the outside legs and a main winding wound on the center leg, means for connecting said main winding across an alternating current source and including means to create a firing signal for passing alternating current increasing substantially on saturation of the core, means for connecting said firing signal means to said gate electrode for rendering said silicon controlled rectifiers conductive and control means connected to said control windings for adjusting the flux density and the time of saturation of the core in relation to each half cycle for varying the level of illumination of the lamps in response to the change in said control means.

11. Apparatus for controlling the illumination of incandescent lamps as set forth in claim 10 wherein said saturable reactor has feedback windings on the outer legs of said core and a feedback circuit is provided connecting said windings across said output to modify the variation in illumination thereof.

12. Apparatus for controlling the illumination of incandescent lamps as set forth in claim 10 wherein for each silicon controlled rectifier a resistor and rectifier are connected in series between said gate electrode and one of said terminals and said main winding is connected between the intermediate points between said resistors and rectifiers.

13. Apparatus for controlling the illumination of incandescent lamps as set forth in claim 10 wherein said firing signal means is a saturating transformer connected between said main winding and said gate electrodes to produce a firing pulse with a rapid rise time.

14. Apparatus for controlling the illumination of incandescent lamps as set forth in claim 13 wherein said saturating transformer has a primary winding and two control windings connected to a respective silicon controlled rectifier, said primary winding and said main winding connected in series across said silicon controlled rectifiers to produce a self-clipping pulse with a rapid rise time.

15. Apparatus for controlling the illumination of incandescent lamps as set forth in claim 13 wherein said saturating transformer has a primary winding and two control windings connected to a respective silicon controlled rectifier, said primary winding and said main winding are connected in series across said silicon controlled rectifiers and said incandescent lamps to provide a sustained pulse with a rapid rise time.

16. Apparatus for controlling the illumination of incandescent lamps supplied with load current from an alternating current source comprising two output terminals and two input terminals, two silicon controlled rectifiers connected in inverse relation between one of said input terminals and a respective output terminal and two uncontrolled rectifiers connected in inverse relation with said other input terminal and a respective output terminal to provide alternating current to the output terminals, a saturable reactor having a core of the three legged type with series connected control windings wound on the outer legs to produce a flux additive in the outside legs and a main winding wound on the center leg, means for connecting said main winding across said input terminals including means to create a firing signal and means for connecting said firing signal means to said silicon controlled rectifiers for alternately firing said silicon controlled rectifiers to provide a direct current output across said output terminals.

17. Apparatus for controlling the illumination of incandescent lamps as set forth in claim 16 wherein said firing signal means is a saturating transformer connected between said main windings and said gate electrodes of said silicon controlled rectifiers to produce a firing pulse with a rapid rise time.

References Cited

UNITED STATES PATENTS

| | | | |
|---|---|---|---|
| 3,193,725 | 7/1965 | Skirpan | 315—194 |
| 3,256,380 | 6/1966 | Meinema et al. | 323—89 |
| 3,295,054 | 12/1966 | Gutzwiller et al. | 307—88.5 |
| 3,310,687 | 3/1967 | Howell | 315—194 |

JOHN W. HUCKERT, *Primary Examiner.*

J. D. CRAIG, *Assistant Examiner.*